USO05762349A

United States Patent [19]
Gancarz

[11] Patent Number: 5,762,349
[45] Date of Patent: Jun. 9, 1998

[54] RELEASABLY ATTACHABLE BICYCLE FENDER

[76] Inventor: Robert M. Gancarz, 98 Szetela Dr., Chicopee, Mass. 01013

[21] Appl. No.: 680,816

[22] Filed: Jul. 16, 1996

[51] Int. Cl.$^6$ ............................................. B62D 25/16
[52] U.S. Cl. ................................. 280/152.3; 280/852
[58] Field of Search ......................... 280/152.1, 152.3, 280/848, 154, 852, 160.1

[56] References Cited

U.S. PATENT DOCUMENTS

| D. 316,995 | 5/1991 | Kowalski | 280/152.3 X |
| 4,319,763 | 3/1982 | White | 280/852 X |
| 5,121,935 | 6/1992 | Mathieu et al. | 280/152.3 |
| 5,562,296 | 10/1996 | Hall et al. | 280/852 X |

FOREIGN PATENT DOCUMENTS 26291  11/1896  United Kingdom ............... 280/152.3

*Primary Examiner*—Robert J. Oberleitner
*Assistant Examiner*—Michael Mar
*Attorney, Agent, or Firm*—Ross, Ross & Flavin

[57] ABSTRACT

A mud guard adapted for releasable attachment to the saddle of a bicycle comprises a sheet of a semi-rigid body adapted to be folded so as to define a long projecting open ended nose or snout sleevable over the forward end of a bicycle saddle so that the tail of the so-folded sheet may be extended rearwardly of the saddle and outwardly thereof in a cantilevered manner over and in spaced relationship to the rear wheel of the bicycle.

1 Claim, 1 Drawing Sheet

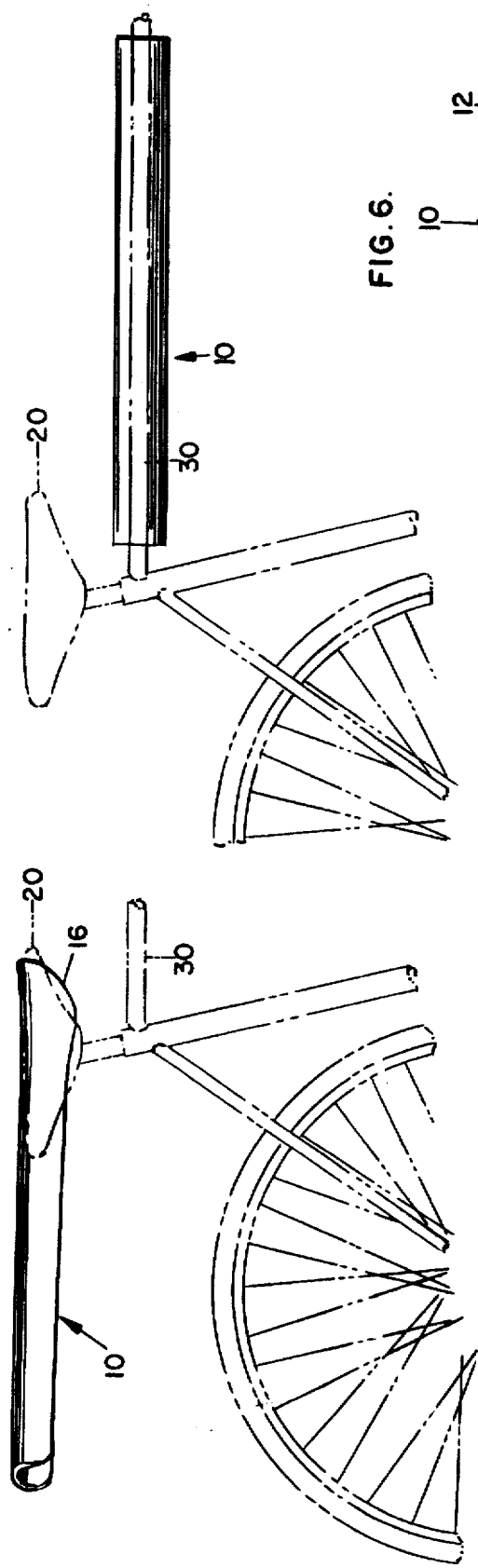
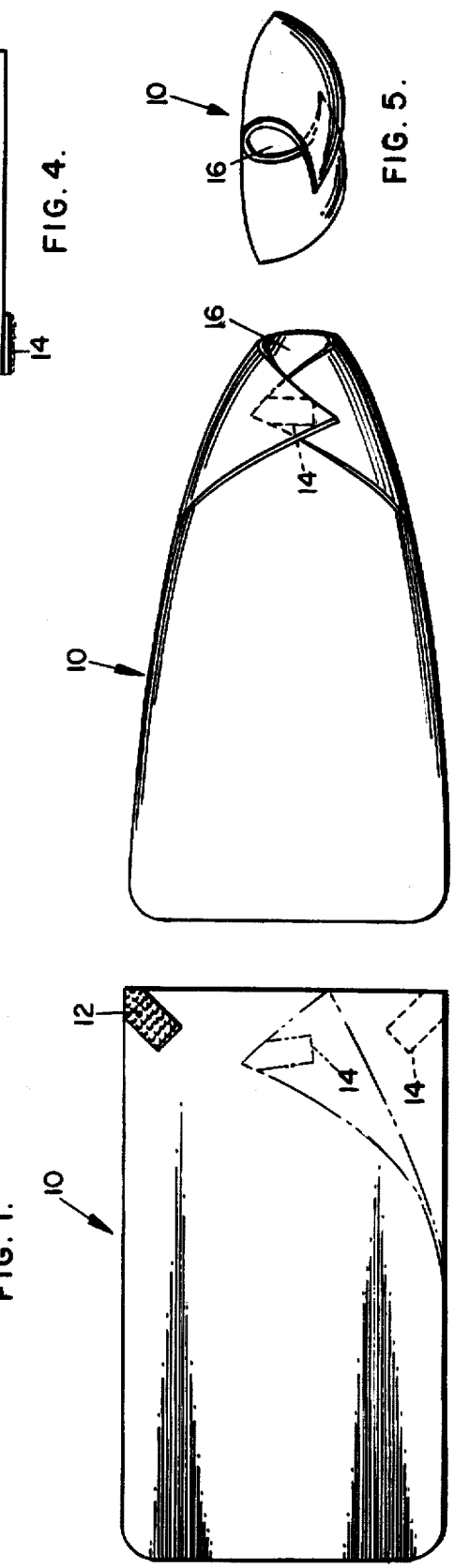

RELEASABLY ATTACHABLE BICYCLE FENDER

BACKGROUND OF THE INVENTION

1. Field of the Invention

My invention relates to bicycles and other vehicles of that general type. More particularly it has to do with an attached splash guard or fender for a bicycle and a method of releasably attaching the splash guard to the bicycle.

2. Brief Description of the Prior Art

The only patent reference seemingly pertinent to the subject matter hereof is U.S. Pat. No. 4,319,763, issued to Stoughton K. White under date of Mar. 16, 1982, and teaching a fender which is fixedly attachable to the frame member of a bicycle.

SUMMARY OF THE INVENTION

The present day bicycle, of the multiple speed or ten-speed types, is normally not equipped with fenders. There is a plurality of reasons therefor: they add to the costs, they add to the weight, they detract from the esthetics in the design.

Being fenderless, the bicycle presents particular problems such as when used in rainy weather or over wet surfaces when tires exhibit tendencies to pick up water and/or dirt and throw same onto the back of the operator. Markings on such an operator are sometimes called "skunk stripes".

Obviously, there is a need for such a fender when the bicycle is in use during such adverse operating conditions.

Fenders are known which are attachable to the bicycle frame as by way of special mounting devices, same dictating the use of tools to make the proper connect or disconnect.

Worse, the fender cannot be easily and conveniently carried when not in use because it cannot be easily rolled, folded or otherwise condensed for ease of storage.

BRIEF DESCRIPTION OF THE DRAWINGS

FIG. 1 is a fragmentary view in side elevation of the splash guard in operative position relative to a bicycle saddle;

FIG. 2 is a top plan view of the splash guard in its flat, unfolded position, with one corner shown in phantom in a rolled over position;

FIG. 3 is a bottom plan view of the splash guard in a rolled over position;

FIG. 4 is a small scale end elevational view of the flat unfolded splash guard;

FIG. 5 is an end elevational view of saddle and splash guard as seen from the right of FIG. 1; and FIG. 6 is a fragmentary view in side elevation showing the splash guard in a rolled up position for storage around the horizontal main frame of the bicycle.

DESCRIPTION OF THE PREFERRED EMBODIMENT

I have shown in FIG. 2, the sheet 10 of the splash guard of the invention in its fully-opened, planar position prior to assembly.

It can be mentioned initially that, for storage and/or transportation purposes, this sheet could be rolled up in the usual manner, the sheet being of a flexible, water resistant material, commonly found in the plastics or rubber-like family of materials.

Assuming the unrolled, flattened, planar FIG. 2 position, the forward corners are pullable inwardly toward each other so as to permit their locked interengagement, there being one Velcro patch 12 secured to the upper planar surface at one rightward corner of the sheet and another Velcro patch 14 secured to the lower planar surface at the opposite rightward corner of the sheet so as to allow the interengagement of the patches when the inwardly rolled over corners are brought into the FIG. 3 overlapping relationship to define an open front end or snout 16, as shown in FIGS. 3 and 5.

In lieu of the conventional interengaging means such as VELCRO patches 12 and 14, other conventional interengaging means could be substituted therefor without affecting the scope of the invention.

The splash guard is now adapted for slipping over the bicycle saddle 20 with the forward extremity or beak of the saddle projecting outboard of the snout and with the rearward extremity of the splash guard extending outwardly and rearwardly of the rear end portion of the saddle in a cantilevered manner so as to project in spaced relationship to and vertically above the rear tire.

The splash guard is sufficiently strong and rigid as to stop and deflect any mud or dirt particles which may be thrown up by the bicycle's rear tire.

The splash guard provides a yieldable outer end means capable of absorbing an impact resultant from any mud or other debris projected upwardly by the force of the rotating rear wheel.

When not in use and convenient storage is desired, the splash guard could be positioned in its planar form relative to the horizontal main frame 30 of the bicycle and then rolled upon itself and around the main frame into the rolled up form shown in FIG. 6.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

I claim:

1. A mud guard for a bicycle including a saddle having a forwardly extending beak portion and a horizontal main frame portion, the mud guard including:

an elongated, substantially rectangular-shaped body of relatively rigid yet flexible material, the body having a pair of interengaging means attached to opposite forward corners, the body adapted to be operatively configured by turning inwardly opposite forward corner portions of the body with the opposite forward corners overlapping and with the pair of interengaging means in an interlocking relationship to form a snout having an open front end, the mud guard adapted to assume an operative position when secured to the saddle by sliding the operatively configured body in a rearward direction over the saddle to an overlying relationship therewith with the beak portion of the saddle extending through the open front end of the snout and with a rearward extremity of the body cantilevered outwardly and rearwardly of the saddle and in spaced relationship above a rear tire of the bicycle, and the mud guard adapted to assume a storage position when rolled upon itself around the horizontal main frame portion of the bicycle.

* * * * *